June 17, 1969   J. D. WATTS   3,450,384
PLUG VALVE ASSEMBLY
Filed March 16, 1966   Sheet 1 of 3

INVENTOR.
JOHN D. WATTS
BY
Strauch, Nolan, Neale,
Nies & Bronaugh
ATTORNEYS

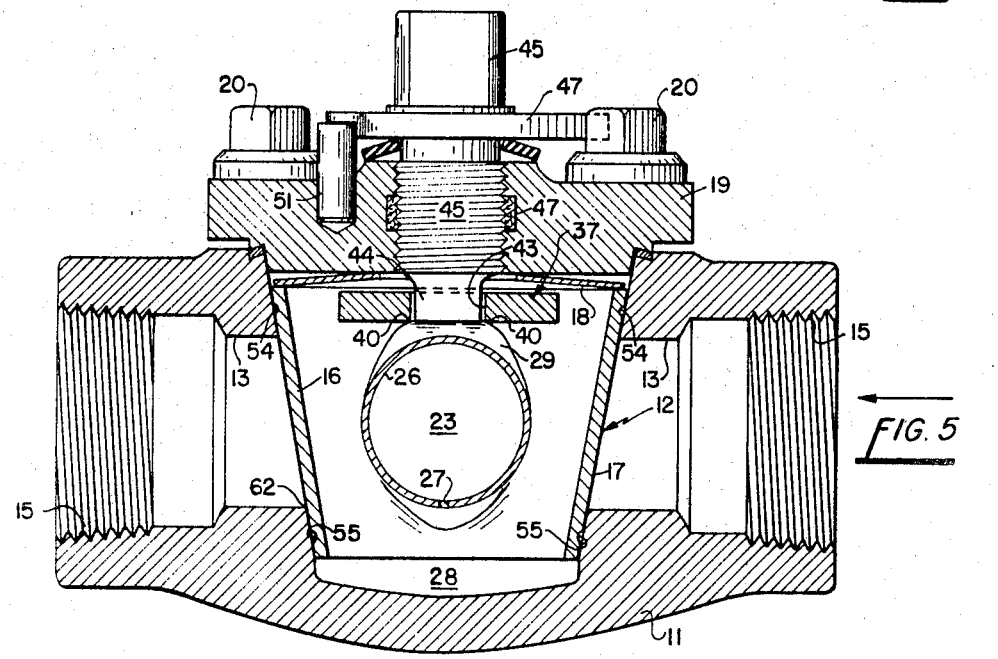
FIG. 5
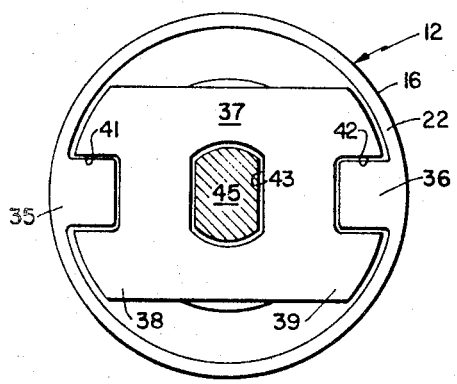
FIG. 3
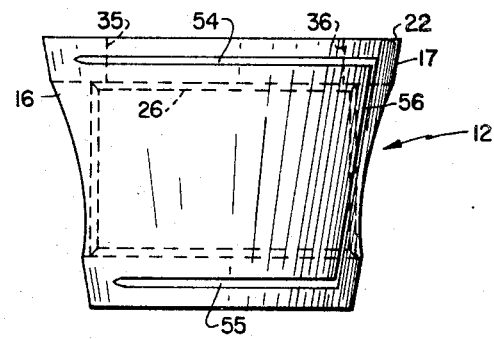
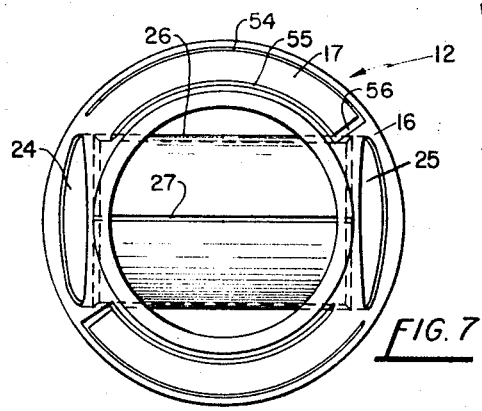
FIG. 7
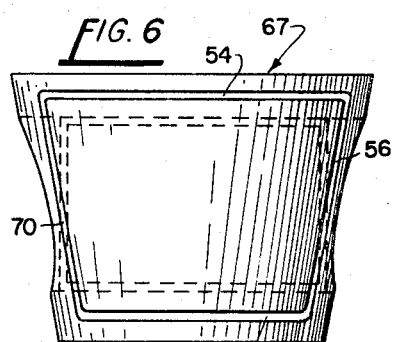
FIG. 11
INVENTOR.
JOHN D. WATTS
BY
Strauch, Nolan, Neale,
Nies & Bronaugh
ATTORNEYS

INVENTOR
JOHN D. WATTS

United States Patent Office 3,450,384
Patented June 17, 1969

3,450,384
PLUG VALVE ASSEMBLY
John D. Watts, Monroeville, Pa., assignor to Rockwell Manufacturing Company, Pittsburgh, Pa., a corporation of Pennsylvania
Filed Mar. 16, 1966, Ser. No. 534,875
Int. Cl. F16k 5/02, 27/06
U.S. Cl. 251—175
20 Claims

ABSTRACT OF THE DISCLOSURE

A plug valve assembly comprises a body having a through fluid passage intersected by a bore and a hollow plug rotatably mounted within the bore, the plug having a relatively thin annular side wall deformable under line fluid pressure and having a tube extending between side wall openings defining a transverse plug passage. When the plug is rotated to valve closed position, the plug side wall extends over and blocks the body passage on the downstream side, and upstream fluid pressure trapped within the hollow plug flexes the plug side wall to conform to the surface of the bore surrounding the body passage at the downstream side, for improved closure and sealing. The hollow plug is spring biased into seating within the bore, and lubricant grooving is provided between the plug side wall and body.

---

This invention relates to plug valve assemblies and is particularly concerned with a novel hollow plug structure providing improved valve performance under line conditions.

Prior theory in the development and construction of plug valves for use in relatively high fluid pressure pipe lines has stressed the provision of relatively rigid body and plug passage walls to withstand deformation. Relatively complex solid valve structures have also been proposed for compensating for pressures encountered during operation to attempt to avoid such deformation. Sealing problems are encountered in these valves due to deformation of the plug seats arising from unpredictable deformation of irregular heavy castings under conditions of high pressure and elevated temperature and pipe line connection stress.

In order to provide an intimate contact between the plug and the seating areas it has been conventional to provide a plug taper which is "self-locking," that is appropriately 4½° or less. However, this characteristic of being self-locking introduces other disadvantages. For example, on high pressures the valve body in which the seats are formed tends to expand and the plug being spring pressed into the seat becomes "locked" in the seat as the high pressures are reduced, thereby "freezing" the plug in the seat. Because of these considerations it has been necessary to provide means to "jack" the plug from its seat when self-locking tapers on the plug are used. This jacking is usually accomplished by a system of hydraulic passages which enable fluid pressures to be against the plug in an unseating direction.

While such valves operate well with proper maintenance it has been found that in many cases as a practical matter, field operators simply neglect to "jack" the valves when they become stuck. It would, therefore, be desirable to provide a taper plug valve which is not subject to the disadvantages of the self-locking taper, but which will nevertheless provide an effective downstream seal. Also, when actuators are used to open or close valves, sometimes from a location remote from the valves, provisions become unwieldly, undependable, complicated and expensive.

Throughout this specification and these claims where the term "locking" is used, it is taken to mean the taper angle at which the plug will lock to the body of the valve. This is well known in the art, more particularly in the power tool art where this locking characteristic of metals is utilized to hold fixtures to machine tools and in other cases (where a greater taper angle is used) to keep these fixtures from becoming locked in a tool holder. Also, throughout this specification and these claims where a taper angle is referred to, this angle has reference to the angle between the center line of the plug or body and the face of the plug or body, as is customary in the valve art, which differs slightly from the power tool art in this respect.

As pointed out above, in conventional plug valves in order to provide the necessary seating contact effort, it has been necessary to provide a self-locking taper. The present invention eliminates the need for a self-locking taper by the provision of a relatively thin walled plug into the interior of which the upstream pressure is admitted so that the upstream fluid pressure urges the relatively deformable thin wall of the plug into intimate engagement with the downstream seating areas at all times while in a closed position.

The present invention is concerned with a relatively structurally simple arrangement that provides in its preferred embodiment a tapered hollow plug of special construction in a more or less conventional relatively rigid valve body, the plug comprising a relatively thin-walled shell capable of adapting itself to changing body bore contour during high pressure operation and with the plug passage being defined by a tube fabricated into assembly with the shell.

The present invention is additionally concerned with providing a novel tapered plug valve assembly that needs no jacking facilities to operate the valve, nor needs lubricant for operation, yet seals tightly within the working range of the valve.

It is therefore the major object of this invention to provide a plug valve assembly having a novel hollow plug construction with a non-locking taper angle.

A further object of the invention is to provide a valve plug structure having novel fluid pressure equalization arrangements.

A further object of the invention is to provide in a plug valve assembly the novel combination of a relatively thin-walled plug shell capable of deformably adapting itself under fluid pressure to changing body shape at the body bore at the downstream body port.

A further object of the invention is to provide a novel plug structure comprising a tapered hollow shell mounting a plug passage defining tube that is preferably slotted for pressure equalization.

Another object of the invention is to provide a novel tapered valve plug wherein a hollow frusto-conical plug shell, usually a thin-walled casting, has diametrically opposite side openings bridged by a passage defining sheet metal tube. Pursuant to the object only one end of the tube is fixed, as by welding, to the shell.

A further object of the invention is to provide a novel tapered plug valve assembly wherein a hollow fabricated plug is urged into its bore by resilient means in the form of a spring compressed between the larger end of the plug and the body cover.

A further object of the invention is to provide a hollow tapered plug which utilizes the flow line pressure to aid in sealing off the flow channel when in a flow-blocking position.

A further object of the invention is to provide a valve assembly having a novel drive connection between a rotatable valve stem and a hollow valve plug.

It is another object of the invention to provide a plug valve embodying a hollow plug and novel automatic sealing means responsive to line pressure.

Further objects will appear as the description proceeds in connection with the appended claims and the annexed drawings wherein;

FIGURE 3 is a top plan view partly in section showing the plug with the drive plate in position;

FIGURE 5 is a section like FIGURE 2 but showing internal structure with the plug in valve closed position;

FIGURE 6 is a side elevation of the plug of FIGURES 1-5 showing the sealant distribution grooves;

FIGURE 7 is a bottom plan view of the plug of FIGURES 1-6;

FIGURE 11 shows the plug grooving for the embodiment shown in FIGURE 8.

Figures 1, 2, 4:
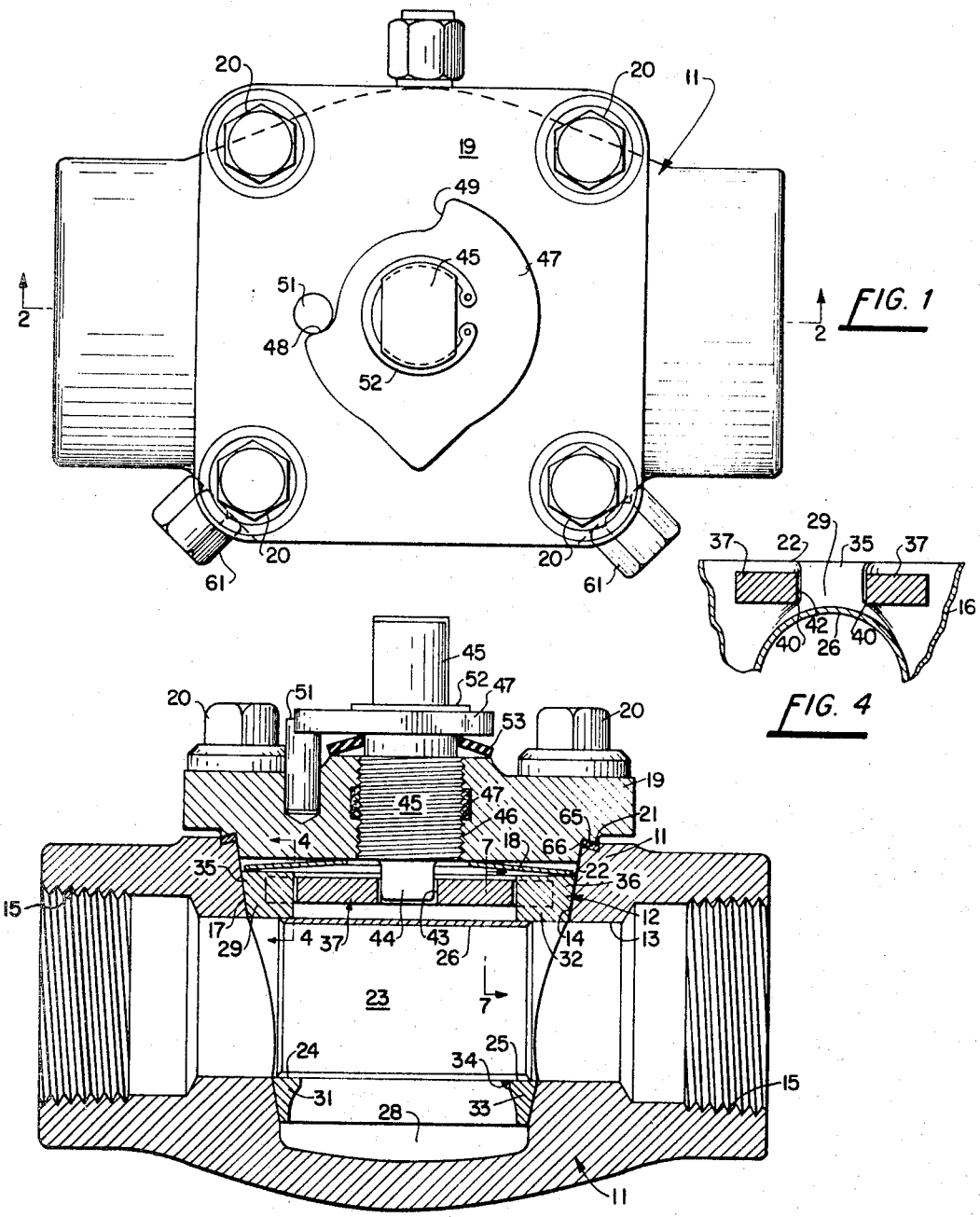
FIGURE 1 is a top plan view showing a plug valve according to a preferred embodiment of the invention.
FIGURE 2 is a section substantially on line 2—2 of FIGURE 1 showing internal structure with the plug in valve open position.
FIGURE 4 is a fragmentary elevation mainly in section at line 4—4 in FIGURE 2 showing the drive plate arrangement.

In its preferred embodiment the valve assembly of the invention comprises a more or less conventional cast steel body 11 and an entirely new plug 12.

Body 11 is provided with a longitudinal through passage 13 intersected at right angles by a tapered smooth-walled bore 14 wherein the plug 12 is rotatably seated. At its outer ends passage 13 is formed with threaded sections 15 for connection into a pipe line. Passage 13 is preferably cylindrical. Bore 14 is open at the larger top end and closed at the other end.

Plug 12 comprises a hollow relatively thin-walled steel or like metal shell casting 16 in the form of a frustum of a cone and it is open at top and bottom. The slope of smooth external surface 17 of the plug is the same as that of the body bore for smooth rotative interfitting.

In the assembly, plug 12 is urged axially into seating engagement with bore 14 by resilient means such as the dished bowed annular spring plate 18. The open end of bore 14 is closed by a relatively heavy cover 19 which is rigidly secured to body 11 as by a group of bolts 20 with an annular compressible metal gasket 21 sealing fluid and pressure tight the joint between the cover 19 and body 11.

When the bolts 20 are drawn tight spring 18, which has its smaller diameter periphery bearing on the underside of cover 19 and its larger diameter periphery bearing on the flat annular upper face 22 of hollow plug 12, is compressed and maintained energized within the bore so as to exert a constant plug seating pressure.

Plug 12 is provided with a through passage 23 adapted to align with passage 13 in valve open position (FIGURE 2), and plug 12 blocks passage 13 in valve closed position (FIGURE 5).

In the invention, passage 23 is preferably formed by providing identical diameter circular wall apertures 24 and 25 diametrically opposite in the plug shell casting and providing a relatively thin-walled sheet metal tube 26 extending at right angles to the axis of rotation of the plug to dispose its opposite ends within apertures 24 and 25.

Preferably tube 26 is formed by curving into a cylindrical shape slightly less than the diameter of the plug wall apertures a plate of light springy sheet steel cut to proper length, thrusting the cylinder into position across the apertures and then releasing it to expand radially as permitted by the apertures. During this operation the adjacent edges of the curved plate are preferably located to face downwardly so that, as shown in FIGURES 5 and 7, a longitudinal bottom slot 27 appears along the tube 26 that provides fluid communication between the interior of the tube and the body cavity 28 at the lower end of bore 14.

At the inner side of aperture 24 the plug wall is formed with thickened upper and lower arcuate regions 29 and 31 respectively to provide ample area support for the tube end. Similarly at the inner side of aperture 25 the plug wall is formed with thickened upper and lower arcuate regions 32 and 33 respectively to support the other tube end. Tube 26 when in proper position is annularly welded at one end at 34 to the plug wall.

The other end of tube 26 is free and not welded to the plug casting but has a bearing fit with aperture 24, whereby relative movement between that end of the tube and the plug shell such as may be due to different thermal expansions while handling hot fluids is permitted. Also, when the valve body is deformed at extreme pressures, the tube 26 cannot act as a tensile member across opposite sides of the plug shell, which would restrain the deformation of the plug shell.

Above tube 26, see FIGURES 2-4, upper thickened wall regions 29 and 32 are formed to provide diametrically opposed integral rectangular lugs 35 and 36 on the plug wall that project toward each other and have their upper flat surfaces flush and coplanar with the annular plug face 22.

A flat drive plate 37, best shown in FIGURE 3, rests at opposite bifurcated ends 38 and 39 on the upwardly facing plug shelves indicated at 40 in FIGURES 4 and 5 formed by the juncture of lugs 35 and 36 with the thickened walls so that rectangular diametrically aligned end drive plate recesses 41 and 42 embrace the sides of plug lugs 35 and 36. Shelves 40 are at the same level so that plate 37 is supported to extend at right angles to the plug axis.

The central portion of drive plate 37 is formed with a straight side elongated slot 43 extending at right angles to recesses 41 and 42. Slot 43 is adapted to receive the rectangular tang 44 that projects in the bore 14 from the lower end of a valve stem 45 that is rotatably mounted as by the threaded bore connection at 46 in cover 19. A stem seal annulus is provided in the bore at 47.

Stem 45 projects upwardly out of the threaded bore 46 and has attached thereto a stop plate 47 having faces 48 and 49 which coact with stop pin 51 on the body to determine the open and closed limit positions of rotation of the plug.

A retainer ring 52 prevents upward displacement of plate 47, and suitable dish-shaped resilient rubber or like seal annulus 53 is axially compressed between the cover and plate 47. This seal 53 may be of the type disclosed in the copending application of Jisha Ser. No. 375,259, filed June 15, 1964 to which reference is made for any further detail. The function of this seal is to prevent outward loss of lubricant from annulus 47 along the stem, and to prevent the entrance of dirt and moisture along the stem.

Figure 9:
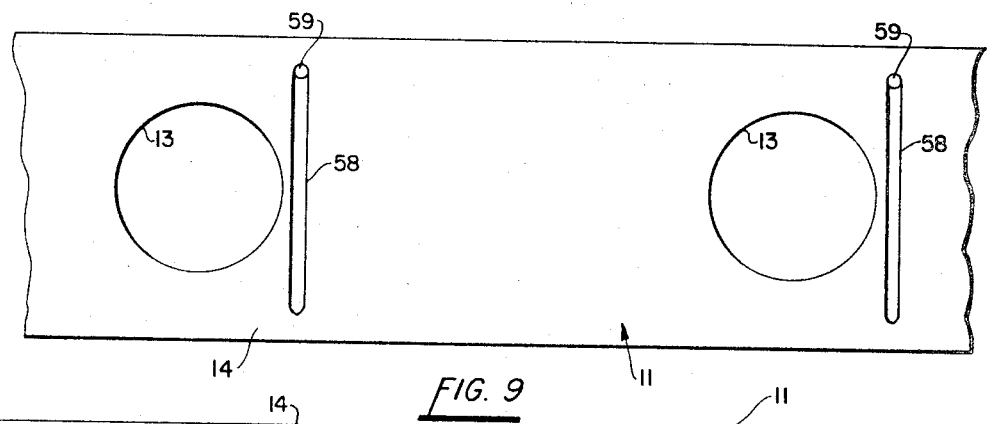
FIGURE 9 shows body wall grooving for sealant distribution in the preferred embodiment as shown in FIGURE 1.
Figure 10:
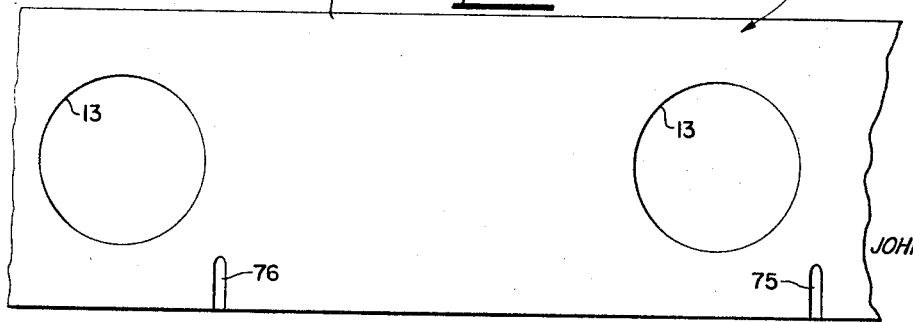
FIGURE 10 shows body wall grooving for the embodiment shown in FIGURE 8.

As shown in FIGURES 6 and 7, the conical plug surface 17 is provided with sealant grooving disposed between the apertures 24 and 25 and comprising parallel circumferential grooves 54 and 55 connected at one end by a longitudinal groove 56. Referring to FIGURE 9, the body bore 14 is provided with sets of longitudinal grooving 58 adjacent each body passage port. These body grooving sets are each connected by body wall ports 59 to a sealant introduction means 61 (FIGURE 1) which may be the usual stick sealant pressure screws or fittings adapted to receive a grease gun.

In any event the plug surface and body grooving is so arranged that when the plug is in the closed position of FIGURE 5 a continuous band of sealant under pressure is supplied from fittings 61 to surround and seal the body passage ports. The particular grooving arrangement in the body is not part of the present invention.

In operation, referring to FIGURE 5 and the directions of flow shown by the arrow, when the hollow plug 12 is in closed valve position it contains entrapped fluid at upstream line pressure within tube 26 and because of slot 27 within the shell 16. Under high line fluid pressures the plug body is deformed which changes the body bore 14 shape around the downstream port 62, but at the same time the entire plug 12 is urged downstream against the bore wall and the fluid pressure within the plug exerts itself to deformably flex the shell 16 sufficiently to adapt itself to the changed body bore shape around port 62. Thus the invention provides optimum seating of the plug in the body bore at the downstream side. Added to this seating is the annular band of sealant around the port 62 which guarantees a fluid tight closure for the valve.

The same would be true if the flow is reversed.

The spring 18 is of sufficient strength to provide a nominal bias to the plug, but it permits upward displacement of the plug when sealant pressure is increased sufficiently on the body-plug surface grooving. Any such plug displacement is only temporary, so as to discharge excess sealant, and spring 18 urges plug 12 into full seating engagement with bore 14.

In a two inch valve of the type above described I have found that a steel plug shell having a wall thickness of about ⅛″ is satisfactory.

The angle of tape of bore 14 must be great enough that it is not self-locking under the worse conditions encountered. This is accomplished by use of an interface taper whose angle to the center line is greater than the angle of friction between the two surfaces. The angle of friction as commonly defined is the angle with the horizontal at which sliding friction is overcome by the force of gravity between two surfaces. In this case, it would be the angle between the center line of the plug and the face of the plug in contact with the body of the valve.

This valve is designed with sealant grooves only as an added convenience when attendant operated. The provision of sealant is not an absolute prerequisite to the sealing of the valve plug.

The minimum taper angle using a metal plug in a metal body that will perform satisfactorily has been found to be very close to 10°. Any angle less than the angle of friction has been found to lock up while any angle much greater than this would be uneconomical inasmuch as it would require a larger cover plate, a greater sealing area between the cover and the body, more cover bolts to hold it down, etc.

Referring to FIGURE 2, it will be noted that seal gasket 21 is an annulus compressed between parallel surfaces 65 and 66 on the cover and body respectively that are inclined downwardly and outwardly with respect to the axis of the plug, whereby elongation of the body in the direction of fluid flow by line pressure will tend to increase the compression of the seal ring 21 between the cover and body.

Referring to FIGURE 3, it will be noted that the drive plate recesses 41 and 42 and slot 43 are sufficiently oversized with respect to the plug lugs 35 and 36 and the valve stem tang 45 to permit bodily shift of the plug 12 in response to line fluid pressure without increasing the torque required to rotate the plug in bore 14.

Figure 8:
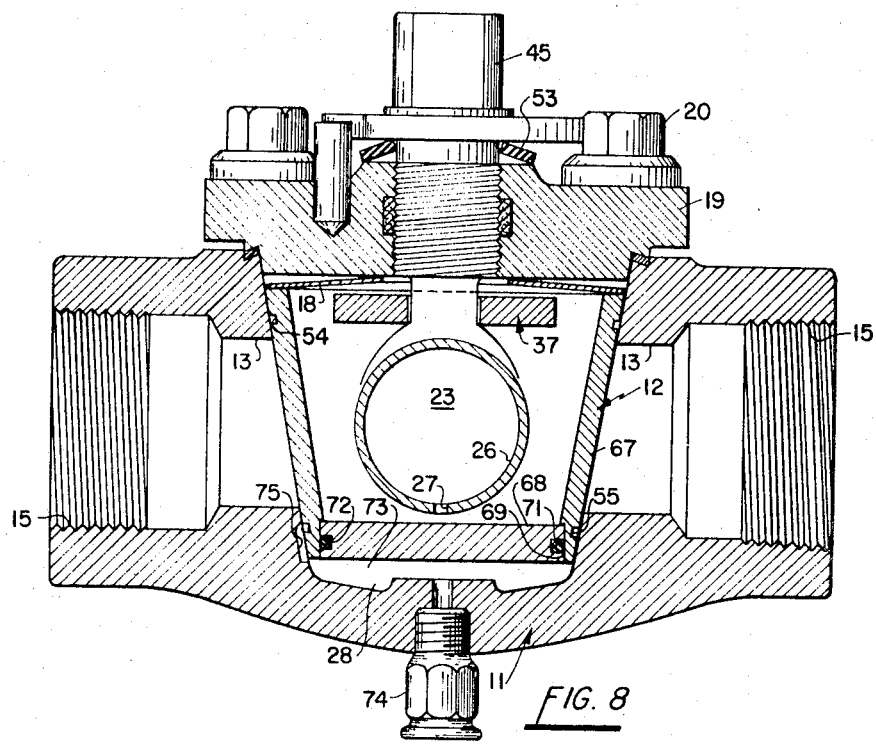
FIGURE 8 is a sectional view showing a further embodiment of the invention wherein the plug has an expansible lower wall for automatic sealing in response to line pressure.

FIGURE 8 illustrates a form of the invention embodying automatic sealant injection at the bearing interface between the plug and bore. The plug shell 67 of FIGURE 8 is hollow and essentially the same as in FIGURES 1–7, except that the lower end is closed by a piston 68 that is axially slidably mounted in cylindrical plug end bore 69 at the small end of the plug. A conventional resilient O-ring 71 in an annular groove 72 in the piston provides a pressure tight seal between the piston and bore 69. An additional sealant groove has been added, as shown in FIGURE 11.

The body space 28 in this embodiment is filled with a body of fluent plastic sealant 73 admitted under pressure by a conventional manual sealant screw or a grease gun fitting at 74, and the body of sealant 73 is connected by grooves 75 and 76 in the body surface with the plug grooving system of FIGURE 11. In this embodiment the pipe line pressure within the hollow plug 12 is effective automatically to displace piston 68 downwardly and thereby displace sealant from body 73 through the grooves into the plug-body interface grooving to replace lost or washed away sealant. The plug here can be jacked from its seat by increasing the sealant pressure at fitting 74 until excess pressure (that in excess of line pressure) is bled off into the flow line, when spring 18 returns the plug to a seated position. In this embodiment the fittings 61 of FIGURE 1 are not employed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A plug valve assembly comprising a body having a through fluid passage intersected by a bore, a hollow plug rotatably mounted within said bore, said plug having a relatively thin annular side wall deformable under line fluid pressure and having means defining a transverse plug passage, means for rotating said plug within the bore between a valve open position wherein said plug passage is in communication at opposite ends with said body passage and a valve closed position wherein said side wall extends over and blocks the body passage at least on the downstream side, the interior of said plug containing line fluid at line pressure when the valve is open, and line fluid pressure retained within said hollow plug when the valve is closed being effective to urge said deformable plug side wall into conforming engagement with the surface of the bore surrounding said body passage at the downstream side.

2. The plug valve assembly defined in claim 1 wherein said bore is tapered and the plug is correspondingly tapered, the angle of taper being approximately 10°.

3. In the plug valve assembly defined in claim 1, said hollow plug being open at opposite ends and resilient means reacting between the body and plug urging the plug to seat within said bore.

4. The plug valve assembly defined in claim 3, wherein said resilient means is an annular dished plate spring with its outer periphery bearing on the upper end of said plug, and said body comprises a cover that internally engages the inner periphery of said spring to maintain it compressed in the assembly.

5. The plug valve assembly defined in claim 3, wherein said resilient means is a spring compressed between a cover and the larger end of said plug, and said means for rotating the plug comprises a drive member nonrotatably mounted on the larger end of the plug below said spring and a valve stem rotatably mounted on the body with its inner end extending through the spring and nonrotatably connected to said drive member.

6. In the plug valve assembly defined in claim 1, said bore being tapered and being closed by a body wall at its lower smaller end and open at its larger upper end, said plug consisting essentially of an integral open ended shell having an external tapered surface corresponding to said bore and a transverse passage defining tube extending between opposite side openings in the shell, a body cover removably mounted over the larger end of said bore, and a stem rotatably mounted on said cover with an end thereof having a lost motion nonrotatable connection to said plug permitting displacement of the plug toward the body passage opening into said bore under the influence of upstream line pressure.

7. The plug valve assembly defined in claim 1, wherein said plug passage defining means is a tube extending between opposite side wall apertures.

8. The plug valve assembly defined in claim 7, wherein said tube is apertured to provide communication of line pressure to the interior of said hollow plug.

9. The plug valve assembly defined in claim 7, wherein said plug is an integral metal casting and said tube is formed of sheet metal.

10. The plug valve assembly defined in claim 7, wherein said tube is bonded as by welding at one end to said side wall and its other end is freely mounted on the side wall.

11. The plug valve assembly defined in claim 1, wherein said means for rotating the plug comprises a drive member extending across the end of the plug and nonrotatably connected to the plug at one end of said bore, and a valve stem is rotatably mounted in a body cover and provided with a noncircular inner end coupled to said drive member.

12. The plug valve assembly defined in claim 11, wherein said drive member is a rigid plate supported on said plug above the tube and said plate is formed with opposite end recesses engaging integral lugs on said plug.

13. The plug valve assembly defined in claim 1, comprising cooperating grooving in the seating surfaces of said plug and bore forming a continuous band of sealant around at least the downstream body passage port when the plug is in valve closed position.

14. The plug valve assembly defined in claim 13, wherein means is provided for automatically maintaining said grooving filled with sealant.

15. The plug valve assembly defined in claim 14, wherein said bore is closed at one end and said means for automatically maintaining the grooving filled with sealant comprises a body of sealant in the body at the closed end of said bore with groove means connecting it to said grooving and piston means carried by said plug contacting said sealant body on one side and exposed to the interior of said hollow plug on the other side.

16. The plug valve assembly defined in claim 1, wherein said body has a removable cover extending over the upper end of said bore, and said body and cover have parallel annular surfaces between which sealing means is compressed when the cover is tightly secured on the body, said surfaces extending angularly with respect to the axis of rotation of the plug whereby plug body deformation due to line pressure increases the compression of said sealing means.

17. A valve plug comprising a relatively thin-walled tapered shell open at top and bottom and formed with diametrically opposite side wall apertures, a thin-walled tube extending through the shell with one end permanently secured to the shell at one of said apertures and the other end free with the other of said apertures.

18. The valve plug defined in claim 17 wherein integral drive lugs project toward each other at the larger open end of the plug.

19. The valve plug defined in claim 17 wherein said tube is slotted along its length within the plug.

20. The valve plug defined in claim 17 having an angle defined by an extension of the plug outer surface to its intersection with the center line of the plug, that is approximately ten degrees.

References Cited

UNITED STATES PATENTS

| 268,006 | 11/1882 | Dibble | 251—175 |
| 2,432,225 | 12/1947 | Carbon | 251—182 XR |
| 2,530,744 | 11/1950 | Volpin | 137—246.12 XR |
| 2,856,150 | 10/1958 | McDonald | 251—175 |
| 2,891,566 | 6/1959 | Volpin | 137—246.12 |
| 2,931,380 | 4/1960 | Mueller | 251—184 XR |
| 2,994,504 | 8/1961 | Reed | 251—312 |

FOREIGN PATENTS

| 1,060,216 | 11/1153 | France. |
| 718,272 | 11/1954 | Great Britain. |

HAROLD W. WEAKLEY, *Primary Examiner.*

U.S. Cl. X.R.

251—184, 312